United States Patent
Katayama

(10) Patent No.: US 8,556,998 B2
(45) Date of Patent: *Oct. 15, 2013

(54) METHOD FOR DEWATERING A WATER-CONTAINING COMBUSTIBLE SOLID

(75) Inventor: Yukuo Katayama, Tokyo (JP)

(73) Assignees: Yukuo Katayama, Tokyo (JP); K.E.M. Corporation, Tokyo (JP)

( * ) Notice: Subject to any disclaimer, the term of this patent is extended or adjusted under 35 U.S.C. 154(b) by 1080 days.

This patent is subject to a terminal disclaimer.

(21) Appl. No.: 11/662,969

(22) PCT Filed: Sep. 16, 2004

(86) PCT No.: PCT/JP2004/013551
§ 371 (c)(1),
(2), (4) Date: Mar. 16, 2007

(87) PCT Pub. No.: WO2006/030510
PCT Pub. Date: Mar. 23, 2006

(65) Prior Publication Data
US 2007/0256353 A1    Nov. 8, 2007

(51) Int. Cl.
*C10L 1/32* (2006.01)
*C10L 9/00* (2006.01)

(52) U.S. Cl.
USPC .................. 44/280; 44/589; 44/590; 44/593; 44/596; 44/597

(58) Field of Classification Search
USPC .......................................................... 44/280
See application file for complete search history.

(56) References Cited

U.S. PATENT DOCUMENTS

| | | | |
|---|---|---|---|
| 2,824,790 A | | 2/1958 | Gregory et al. |
| 3,529,981 A | * | 9/1970 | Hawkins et al. ......... 264/211.11 |
| 3,992,784 A | * | 11/1976 | Verschuur et al. .............. 34/385 |
| 4,216,082 A | * | 8/1980 | Verschuur ...................... 209/10 |
| 4,477,257 A | * | 10/1984 | Koppelman et al. ............ 44/632 |

(Continued)

FOREIGN PATENT DOCUMENTS

| | | |
|---|---|---|
| JP | A 54-024457 | 2/1979 |
| JP | A-59-184293 | 10/1984 |

(Continued)

OTHER PUBLICATIONS

Racovalis et al; "Effect of processing conditions on organics in wastewater from hydrothermal dewatering of low-rank coal"; FUEL; vol. 81; pp. 1369-1378; 2002.

Favas et al; "Hydrothermal dewatering of lower rank coals. 1. Effects of process conditions on the properties of dried product"; FUEL; vol. 82; pp. 53-57; 2003.

(Continued)

*Primary Examiner* — Ellen McAvoy
*Assistant Examiner* — Ming Cheung Po
(74) *Attorney, Agent, or Firm* — Oliff & Berridge, PLC

(57) ABSTRACT

A method for dewatering a water-containing combustible solid excluding coal, comprising heating, in a sealed vessel, the water-containing combustible solid at a temperature of 100° C. to 300° C. under a pressure not less than a saturated steam pressure at said heating temperature, while applying a shearing force of 0.01 MPa to 20 MPa to said water-containing combustible solid. The method allows the production of a slurry in water which contains the water separated from the water-containing combustible solid and a combustible solid from which the water is removed, has a suitable viscosity and water content, and can be subjected to spray combustion, at low costs.

11 Claims, 2 Drawing Sheets

(56) References Cited

U.S. PATENT DOCUMENTS

| | | | |
|---|---|---|---|
| 4,541,929 A * | 9/1985 | Janusch | 210/217 |
| 4,607,796 A * | 8/1986 | Enikolopov et al. | 241/3 |
| 4,702,745 A * | 10/1987 | Kamei et al. | 44/592 |
| 4,758,244 A | 7/1988 | Harvey et al. | |
| 4,762,527 A * | 8/1988 | Beshore et al. | 44/280 |
| 4,895,577 A * | 1/1990 | Chornet et al. | 44/492 |
| 4,933,086 A | 6/1990 | McMahon et al. | |
| 5,234,468 A * | 8/1993 | Khan | 48/197 A |
| 2004/0237809 A1 * | 12/2004 | McIntosh et al. | 100/117 |
| 2006/0156622 A1 | 7/2006 | Katayama | |

FOREIGN PATENT DOCUMENTS

| | | |
|---|---|---|
| JP | A-61-252475 | 11/1986 |
| JP | A 62-136299 | 6/1987 |
| JP | A 62-225585 | 10/1987 |
| JP | A 3-76790 | 4/1991 |
| JP | A 8-168800 | 7/1996 |
| JP | A 10-113700 | 5/1998 |
| JP | A 2000-169274 | 6/2000 |
| WO | WO 01/54819 A1 | 8/2001 |
| WO | WO 02/27251 A1 | 4/2002 |
| WO | WO 2004072212 A1 * | 8/2004 |
| WO | WO 2005/007783 A1 | 1/2005 |

OTHER PUBLICATIONS

Favas et al; "Hydrothermal dewatering of lower rank coals. 2. Effects of coal characteristics for a range of Australian and international coals"; FUEL; vol. 82; pp. 59-69; 2003.

Favas et al; "Hydrothermal dewatering of lower rank coals. 3. High-concentration slurries from hydrothermally treated lower rank coals"; FUEL; vol. 82; pp. 71-79; 2003.

Sep. 23, 2008 Office Action issued in copending U.S. Appl. No. 10/564,988, 12 pgs.

Mar. 11, 2009 Office Action issued in copending U.S. Appl. No. 10/564,988, 11 pgs.

Jun. 24, 2009 Office Action issued in copending U.S. Appl. No. 10/564,988, 10 pgs.

Sep. 21, 2004 International Search Report issued in PCT/JP2004/010207, 1 pg.

4 Supplementary European Search Report for Application No. EP 04 74 7672; mailed Dec. 29, 2009.

Office Action in co-pending U.S. Appl. No. 10/564,988; mailed Mar. 23, 2010.

Jul. 16, 2010 Office Action issued in Canadian Application No. 2,580,806.

Aug. 24, 2010 Office Action issued in U.S. Appl. No. 10/564,988.

Apr. 19, 2011 Office Action issued in U.S. Appl. No. 10/564,988.

Feb. 8, 2012 Office Action issued in U.S. Appl. No. 10/564,988.

Dec. 7, 2012 Office Action issued in U.S. Appl. No. 10/564,988.

* cited by examiner

METHOD FOR DEWATERING A WATER-CONTAINING COMBUSTIBLE SOLID

FIELD OF THE INVENTION

The present invention relates to a method for dewatering a water-containing combustible solid, and a method for producing a water slurry of the dewatered combustible solid.

BACKGROUND OF THE INVENTION

A water-containing combustible solid such as sludge has a high water content from 70 to 80% by weight of the sludge after simple dewatering by belting press, roll press or the like. Accordingly, in order to incinerate the sludge in a fluidized incinerator, drying by a hot air drying machine is carried out, and a large amount of energy is consumed for the drying. However, since sludge still contains water in an amount from 30 to 50% by weight of the sludge after being dried, complete combustion of the sludge by a fluidized incinerator is difficult. Accordingly, the unburned combustibles remaining in ash after combustion are burned by petroleum or natural gas under the present conditions. In addition, there are the disadvantages of the fluidized incinerator requiring a huge equipment cost, and requiring a high running and the like. Wood waste discharged from a lumber mill or the like, paper sludge, or the like is similarly difficult to combust completely by a fluidized incinerator, and is incinerated by the similar method.

Accordingly, a method is desired, which is capable of not only easily removing water from a water-containing combustible solid, but also recovering the water-containing combustible solid in a form suitable for incineration.

DISCLOSURE OF THE INVENTION

Problems to be Solved by the Invention

The present invention provides a method for dewatering a water-containing combustible solid substantially without evaporating water. This allows the production, at low costs, a mixture (water slurry) which includes water removed from a water-containing combustible solid and a combustible solid from which the water is removed, has a suitable viscosity and water content, and is capable of being spray combusted.

Means for Solving the Problems

A water-containing combustible solid such as sludge contains a large amount of water. The water is constituted of water which exists in the cellular structure of the sludge, and water contained in earth and sand. In wood waste, water exists in the cellular structure of the wood waste. The present inventor has made the study for efficiently removing these kinds of water from the water-containing combustible solid to obtain a mixture (water slurry) capable of being spray combusted. As a result, the present inventor has found out that by applying the invention according to the unpublished International Patent Application (PCT/JP2004/010207) filed by the present inventor to a water-containing combustible solid, water can be efficiently removed from the water-containing combustible solid, and a slurry product capable of being spray combusted can be manufactured at low costs.

Namely, the present invention is
(1) a method for dewatering a water-containing combustible solid excluding coal, comprising heating, in a sealed vessel, the water-containing combustible solid at a temperature of 100° C. to 300° C. under a pressure not less than a saturated steam pressure at said heating temperature, while applying a shearing force of 0.01 MPa to 20 MPa to said water-containing combustible solid.

Further, the present invention is
(2) a method for producing a slurry of a combustible solid in water, comprising obtaining a mixture of water which was removed from a water-containing combustible solid with a combustible solid from which the water was removed in a sealed vessel as obtained according to the method as set forth in the aforesaid (1), and subsequently removing the water from the mixture existing in the sealed vessel or adding water to the mixture so as to have a water content in the mixture of from 30 to 75% by weight, calculated on the basis of the resulting mixture.

Effects of the Invention

According to the present invention, a mixture (water slurry) which has a viscosity and water content suitable for spray combustion, and contains water which was removed from a water-containing combustible solid and a combustible solid from which the water was removed can be produced easily at low costs.

BEST MODE FOR CARRYING OUT THE INVENTION

The water-containing combustible solid which is subjected to dewatering in the present invention includes, for example, sludge, wood waste, paper sludge, bean-curd lees, bagasse, and livestock waste such as dung, internal organs, brains, other protein portions and fats and oils of livestock. For the water content of the water-containing combustible solid, calculated on the basis of the water-containing combustible solid, the upper limit is preferably 85% by weight, more preferably 70% by weight, and the lower limit is preferably 25% by weight, more preferably 30% by weight, and even more preferably 40% by weight. The water-containing combustible solid with a water content of 40 to 70% by weight, calculated on the basis of the water-containing combustible solid, is preferably used in particular. For a water-containing combustible solid of which water content exceeds the aforesaid upper limit, it is preferable to remove the water therefrom in advance by pressurization by, for example, a belting press, roll press or the like, before or after the under mentioned pulverization to have the water content in the aforesaid range.

The water-containing combustible solid is preferably pulverized into a predetermined particle size before used. As for a particle size, the upper limit is preferably 200 meshes, more preferably 150 meshes, and even more preferably 100 meshes. The lower limit is preferably 3 meshes, more preferably 30 meshes, and even more preferably 50 meshes. With a particle size of the water-containing combustible solid of less than the aforesaid lower limit, the combustible solid easily sediments in a water slurry. With a particle size exceeding the aforesaid upper limit, the viscosity of the water slurry is too high and, further, an extra power is consumed for pulverization.

In the present invention, the water-containing combustible solid is introduced into a sealed vessel and dewatered. The sealed vessel should be capable of heating the water-containing combustible solid under pressurization, and capable of applying a shearing force to the water-containing combustible solid. For example, use may be made of a single screw pressing/heating type kneader having a stirring blade disclosed in Japanese Patent Application Laid-open No. 2000-169274. Further, for example, a kneader having a screw type stirring blade of a single screw or a twin screw, preferably a twin screw, or, for example, a kneader having a screw used in a so-called screw feeder for making ground meat or ground fish can be used. The sealed vessel may be of either a batch type or a continuous type. Any continuous type of sealed vessel is suitably used, which can continuously carry out loading of the water-containing combustible solid, withdrawing of the dewatered combustible solid, and withdrawing of gaseous or liquid water while keeping the predetermined conditions of the present invention.

As for the heating temperature, the upper limit is 300° C., preferably 250° C., and more preferably 200° C., and the lower limit is 100° C., preferably 150° C., and more preferably 170° C. At a temperature exceeding the aforesaid upper limit, the water-containing combustible solid is decomposed by heat, and the apparatus cost becomes extremely high. At a temperature lower than the aforesaid lower limit, the effects of the present invention by dewatering cannot be obtained. As for the heating time, the upper limit is preferably five hours, more preferably three hours, still more preferably one hour, and particularly preferably 30 minutes, and the lower limit is preferably 3 minutes, more preferably 5 minutes, and still more preferably 10 minutes. The heating preferably gives a heat of 2,300 kJ at the maximum per 1 kg of the water contained in the water-containing combustible solid.

The lower limit of the pressure during the heating is the pressure not less than saturated steam pressure at the heating temperature, preferably the pressure not less than the saturated steam pressure at the heating temperature+0.1 MPa, and more preferably the pressure not less than the saturated steam pressure at the heating temperature+0.2 MPa. By maintaining this pressure, the water removed from the water-containing combustible solid can be kept in a liquid state and, therefore, unnecessary latent heat of vaporization can be avoided during the dewatering. The upper limit of the pressure is preferably the saturation steam pressure at the heating temperature+1.0 Ma, more preferably the saturation steam pressure at the heating temperature+0.5 MPa, and still more preferably the saturation steam pressure at the heating temperature+0.3 MPa. However, the maximum pressure during the heating is preferably the saturation steam pressure at 300° C. which is the maximum value of the heating temperature+1.0 MPa (=about 9.6 MPa). The pressure exceeding the upper limit is not preferable, because no large improvement is attained in the effects, and the apparatus cost becomes higher. The pressure during the heating can be adjusted preferably by using an inert gas, such as nitrogen and argon as well as steam which occurs from the water-containing combustible solid by heating.

A shearing force is applied to the water-containing combustible solid during the aforesaid heating in the present invention. The upper limit of the shearing force is 20 MPa, preferably 10 MPa, more preferably 5 MPa, and still more preferably 3 MPa, and the lower limit is 0.01 MPa, preferably 0.1 MPa, and more preferably 0.5 MPa. With a shearing force exceeding the aforesaid upper limit, the motor power load becomes larger. With a shearing force less than the aforesaid lower limit, the combustible solid is insufficiently dewatered, and the effects of the present invention by dewatering cannot be obtained. The shearing force may be applied by a stirring blade provided in the sealed vessel. The shearing force in the present invention can be determined as follows. The reference material with a known viscosity (20° C.) such as, for example, Standard LIQUIDS FOR CALIBRATING VISCOMETERS (JIS Z8809) JS100, viscosity 86 mPa·s, JS1400, viscosity 12 Pa·s, and JS160000, viscosity 140 Pa·s, ex NIPPON GREASE Co., Ltd., are each put into a predetermined sealed vessel such as, for example, a sealed vessels shown in FIG. 2 (twin-screw kneader with an in-vessel effective volume of 8 litters, in-vessel length of 600 mm, vessel long diameter of 160 mm, in-vessel shorter diameter of 100 mm, stirring blade diameter of 96 mm, where 13 stirring blades in total are provided per screw with a pitch of 70 mm at a site nearest to the coal supply port, and the pitches decrease each by 4 mm toward the downstream side, and is 22 mm at a site nearest to the product withdrawing port), and a torque exerted on the rotary screw at a temperature of 20° C. is measured while rotating the equipped stirring blades at 60 rpm. For viscosities (20° C.) exceeding 140 Pa·s, a torque is measured using a liquid mixture prepared by mixing kerosene with asphalt (for example, a liquid mixture with a viscosity (20° C.) of 6400 Pa·s measured by a BS type viscometer made by TOKI SANGYO CO., LTD.). Here, the aforesaid measuring liquid is poured until the entire stirring blades in the sealed vessel are completely immersed in the liquid. A torque is measured also the sealed vessel in a vacant state in which the measuring liquid is not present therein, and the shearing force in this state is assumed as zero. In this manner, the torque for each measuring liquid of which viscosity is known is read, and the shearing force is obtained from the following formula to know relationship between the torque and the shearing force as shown in FIG. 1.

Shearing force (Pa)=[viscosity (Pa·s)×shearing speed $(s^{-1})$]/read value of torque In the aforesaid formula, the shearing speed is expressed by the following formula. In the following formula, sin 3.5° is a value specific to the device shown in FIG. 2. The value is obtained from a shape of the stirring blade, and depends upon the shape of the stirring blade.

Shearing speed $(s^{-1})$≈2×3.14×(rotational frequency per second)÷sin 3.5°

In this manner, the shearing force can be obtained from the aforesaid relationship by measuring torque exerted on the rotary screw. For example, the shearing force can be obtained from the relationship shown in FIG. 1 for the sealed vessel shown in FIG. 2. Because a screw torque of the sealed vessel equipped with a stirring blades is specific to an apparatus, the torque differs among apparatuses. Accordingly, the relationship between the torque and the shearing force as shown in FIG. 1 has to be obtained for each apparatus under the same conditions as described above. In this manner, the shearing force can be obtained for any apparatus by measuring the torque exerted on the rotary screw.

According to the aforesaid method of the present invention, a mixture (water slurry) containing the water removed from the water-containing combustible solid and the combustible solid from which the water was removed is obtained in the sealed vessel after dewatering. The water content of the mixture depends upon the water content of the water-containing combustible solid which is used. The mixture can be used in a form of a water slurry in a gasification reactor, a boiler or the like. The water content of the mixture can be increased or decreased, depending upon usage. When the mixture is used as a gasification raw material or a fuel, the water content of the mixture is preferably 30 to 50% by weight, calculated on the basis of the mixture, and more preferably 40 to 50% by weight. When the mixture is incinerated as water-containing waste, it is enough that the combustible solid contained in the mixture has a heating value not less than the latent heat of vaporization of the contained water. The water content of the mixture is preferably 40 to 75% by weight, calculated on the basis of the mixture, and more preferably 40 to 70% by weight. By setting the water content at the aforesaid values, the viscosity (20° C.) of the mixture can be made preferably 10 to 2,000 centipoises (cP=mPa·s), more preferably 20 to 700 centipoises (cP=mPa·s), and still more preferably 30 to 500 centipoises (cP=mPa·s), whereby the water slurry suitable for handling such as transportation can be obtained. Any method can be used for making the concentration of the mixture in the aforesaid range. Preferably, water is removed from the mixture obtained in the sealed vessel after dewatering, or water is added to the mixture. The water can be withdrawn as steam from the mixture in the sealed vessel, whereby, the water slurry of a desired concentration can be produced in one step in the sealed vessel, using the water contained in the water-containing combustible solid, so that the apparatus can be simplified. The water obtained from the water-containing combustible solid contains a small amount of organic substances derived from the starting water-containing combustible solid. The organic substances work as a surface active agent and, therefore, addition of a surface active agent to the aforesaid water slurry can be omitted.

Hereinafter, the present invention will be explained in more detail with reference to the Examples, but the present invention shall not be limited by these Examples.

The water-containing combustible solid used in the Examples was sludge, which had the properties as shown in the following Table 1.

TABLE 1

| Sludge | |
|---|---|
| Water content | 52.1% by weight |
| Ash content | 16.8% by weight |
| Volatile content | 25.4% by weight |
| Fixed carbon | 5.7% by weight |
| Heating value (HHV) | 1790 Kcal/kg |

The water content, the ash content, the volatile content, the fixed carbon and the heating value in the aforesaid Table 1 were determined in accordance with the industrial analysis method (JIS M8812).

For the measurement of a torque, Yamasaki P-100R Type Rotational Torque Meter was used when the torque exceeded 140 kg cm. When the torque was not more than the aforesaid torque value, Yamasaki SS-50R type Rotational Torque Meter was used.

Example 1

As the sealed vessel, the twin-screw kneader as shown in FIG. 2 was used. In FIG. 2, numeral 1 indicates a water-containing combustible solid supply port; numeral 2, a screw; numeral 3, a valve; numeral 4, a steam extracting valve; and numeral 5, a product removing valve. The sludge having the properties shown in Table 1 was pulverized into 30 to 100 meshes in advance. Ten kgs of the pulverized sludge was put in the vessel. The pressure inside the vessel was made 0.7 MPa with a nitrogen gas, and then heating was started while the screw was rotated. Immediately after the temperature reached 170° C., the pressure inside the vessel was adjusted to 1 MPa, and the torque exerted on the stirring screw was measured, and the shearing force was adjusted to 0.5 MPa, using the relationship between the torque and the shearing force shown in FIG. 1. The treatment was conducted for an hour with the pressure, temperature and shearing force inside the vessel kept at the aforesaid values to remove the water from the sludge. Then, the vessel was cooled to ambient temperature and the slurry was taken out. The viscosity (20° C.) of the obtained water slurry was 580 centipoises (cp=mPa·s). The water slurry was capable of being sprayed and its heating value was 1790 Kcal/kg which was the same as that of the raw material. The water slurry was dried at 107° C. for one hour by a drying machine. The decreased amount was considered as the water contained in the slurry so as to calculate the water content of the water slurry. As a result, the water content of the water slurry was about 52% by weight, calculated on the basis of the water slurry. This is substantially equal to the water content, about 52% by weight, in the industrial analysis of the used sludge. This means that the sludge was substantially completely dewatered. The aforesaid slurry viscosity was measured by the BS type viscometer, ex TOKI SANGYO CO., LTD.

COMPARATIVE EXAMPLE 1

Comparative Example 1 was carried out in the same manner as in Example 1 except that the shearing force was 0.001 MPa instead of 0.5 MPa. The viscosity (20° C.) of the obtained water slurry was too high to determine. The water content of the water slurry measured with the same method as in Example 1 was about 21% by weight. The slurry was not sufficiently dewatered, was in a paste state, and had too much viscous to be sprayed.

Example 2

The single-screw pressing/heating type kneading device having the stirring blades as described in Japanese Patent Application Laid-Open No. 2000-169274 was used. The sludge having the properties shown in Table 1 was pulverized into 30 to 100 meshes in advance. Five kgs of the pulverized sludge was put in the vessel of the apparatus. The pressure inside the vessel was made 0.7 MPa with a nitrogen gas. Then, heating was started while rotating the screw. Immediately after the temperature reached 170° C., the pressure inside the vessel was adjusted to 1.0 MPa, and the torque exerted on the stirring screw was measured. The shearing force was adjusted to 0.5 MPa, using the relationship between the torque and the shearing force obtained in advance. The treatment was conducted for an hour with the pressure, temperature and shearing force inside the vessel kept at the aforesaid values, to remove the water from the sludge. Then, the vessel was cooled to ambient temperature and the water slurry was taken out. The viscosity (20° C.) of the obtained water slurry was 450 centipoises (cP=mPa·s). The water slurry was capable of being sprayed, and the heating value (HHV) was 1790 Kcal/kg which was the same as that of the raw material. The water content of the water slurry which was measure with the same method as in Example 1 was about 52% by weight, and thus it is seen that the sludge was substantially completely dewatered.

BRIEF DESCRIPTION ON THE DRAWINGS

INDUSTRIAL APPLICABILITY

Figure 1:
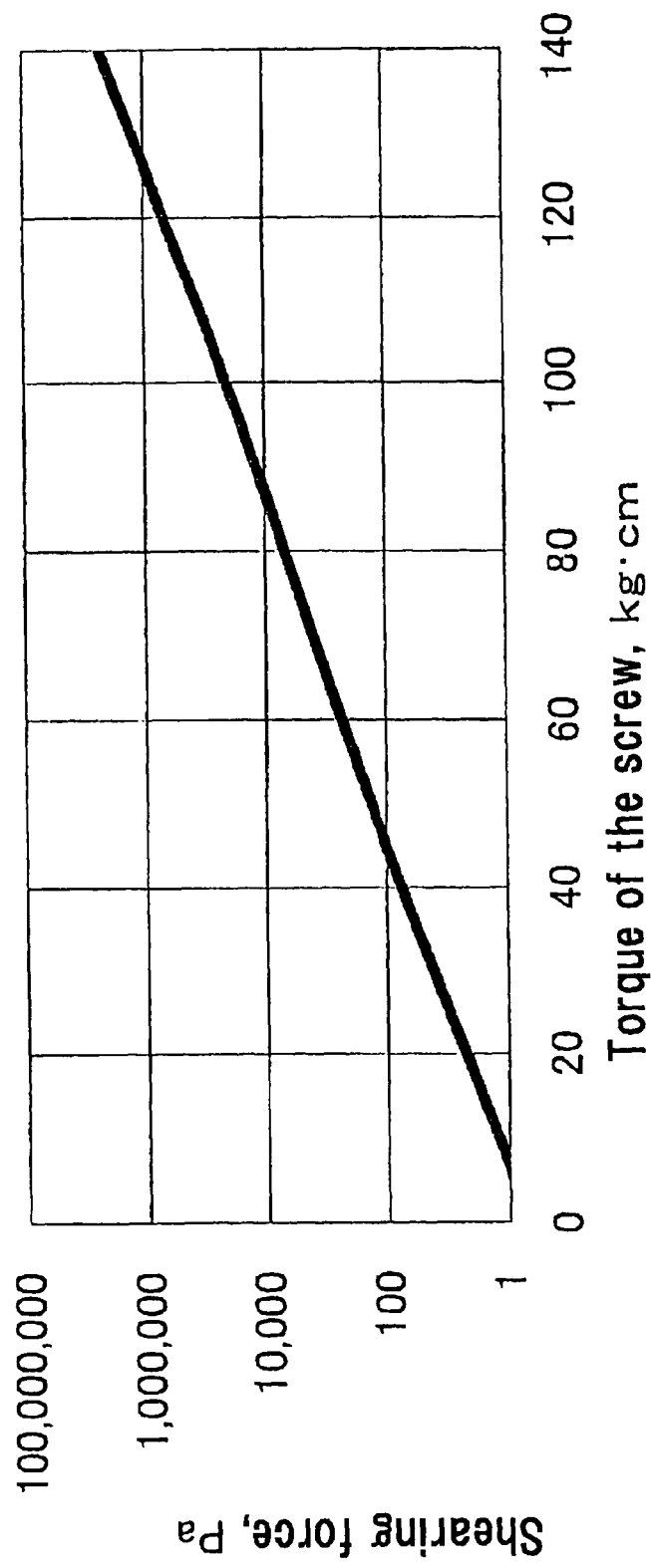
FIG. 1 is a graph showing the relationship between a torque and a shearing force in the kneader shown in FIG. 2.
Figure 2:
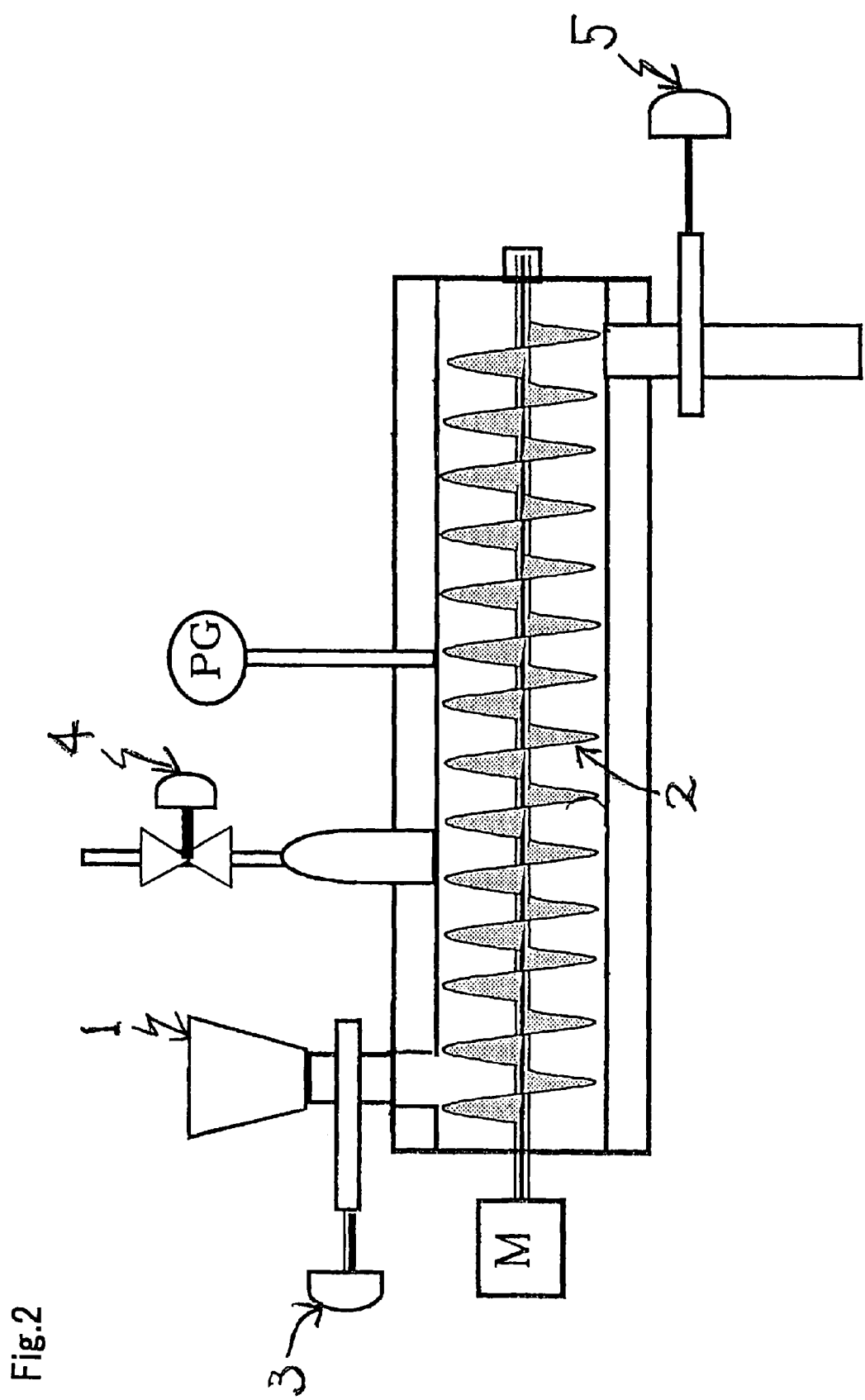
FIG. 2 is a schematic view of an electrically heated twin-screw kneader.

According to the present invention, a mixture (water slurry) can be produced, which has a proper viscosity and water content and contains water removed from the water-containing combustible solid and a combustible solid from which the water was removed. The mixture is capable of being spray combusted and, therefore, is useful as a gasification raw material, a boiler fuel and the like. Sludge, bean-curd lees, bagasse, and livestock dung are liquid, and contain a large amount of protein and starch and, therefore, are usable as a raw material for methane fermentation by bacteria.

The invention claimed is:

1. A method for dewatering a water-containing combustible solid excluding coal, comprising heating, in a sealed vessel, the water-containing combustible solid at a temperature of 100° C. to 300° C. under a pressure not less than a saturated steam pressure at said heating temperature, while simultaneously applying a shearing force of 0.01 MPa to 20 MPa to said water-containing combustible solid.

2. The method according to claim 1, wherein the shearing force is applied by a stirring blade provided in the sealed vessel.

3. The method according to claim 1, wherein the heating temperature is 110° C. to 250° C.

4. The method according to claim 1, wherein the pressure during the heating is not more than the saturated steam pressure at the heating temperature+0.5 MPa, provided that the pressure does not exceed 9.1 MPa.

5. The method according to claim 1, wherein the shearing force is 0.1 MPa to 10 MPa.

6. The method according to claim 1, wherein the heating is conducted in a period of from three minutes to five hours.

7. The method according to claim 1, wherein the water-containing combustible solid is selected from the group consisting of sludge, wood waste, paper sludge, bean-curd lees, bagasse, and dung, internal organs, brains, and fats and oils of livestock.

8. The method according to claim 1, wherein the water-containing combustible solid contains 25 to 85% by weight of water, calculated on the basis of the water-containing combustible solid.

9. A method for producing a slurry of a combustible solid in water, comprising:

obtaining a mixture, the mixture comprising water which was removed from a water-containing combustible solid and the combustible solid from which the water was removed according to the method of claim 1, and subsequently adjusting the water content of the resulting mixture by removing the water from the mixture or supplying additional water to the mixture in order to have a final water content in the mixture of from 30 to 75% by weight, calculated on the basis of the resulting mixture.

10. The method according to claim 9, wherein the water content in the mixture obtained by removing the water or adding water is 40 to 60% by weight, calculated on the basis of the resulting mixture.

11. The method according to claim 2, wherein the stirring blade is comprised of a plurality of blades of varying pitch, the pitch being greatest at a site nearest to a supply port.

* * * * *